(12) United States Patent
Van Zanten et al.

(10) Patent No.: US 8,148,303 B2
(45) Date of Patent: Apr. 3, 2012

(54) SURFACTANT ADDITIVES USED TO RETAIN PRODUCIBILITY WHILE DRILLING

(75) Inventors: Ryan Van Zanten, Spring, TX (US); David Horton, Houston, TX (US); Per-Bjarte Tanche-Larsen, Sandnes (NO)

(73) Assignee: Halliburton Energy Services Inc., Duncan, OK (US)

( * ) Notice: Subject to any disclaimer, the term of this patent is extended or adjusted under 35 U.S.C. 154(b) by 45 days.

(21) Appl. No.: 12/827,451

(22) Filed: Jun. 30, 2010

(65) Prior Publication Data

US 2012/0004146 A1 Jan. 5, 2012

(51) Int. Cl.
C09K 8/02 (2006.01)
C09K 8/04 (2006.01)
C09K 8/12 (2006.01)
E21B 21/00 (2006.01)
E21B 7/00 (2006.01)

(52) U.S. Cl. .......... 507/103; 175/65; 175/72; 507/129; 507/130; 507/134; 507/135; 507/136; 507/139; 507/927; 516/53; 516/58; 516/59; 516/67

(58) Field of Classification Search .................. 507/103, 507/129, 130, 134, 135, 136, 139, 927; 175/65, 175/72; 516/53, 58, 59, 67
See application file for complete search history.

(56) References Cited

U.S. PATENT DOCUMENTS

| | | | |
|---|---|---|---|
| 4,695,389 A | 9/1987 | Kubala | |
| 4,725,372 A | 2/1988 | Teot et al. | |
| 5,030,366 A | 7/1991 | Wilson et al. | |
| 5,309,999 A | 5/1994 | Cowan et al. | |
| 5,314,022 A | 5/1994 | Cowan et al. | |
| 5,361,842 A | 11/1994 | Hale et al. | |
| 5,373,901 A | 12/1994 | Norman et al. | |
| 5,515,921 A | 5/1996 | Cowan et al. | |
| 5,551,516 A | 9/1996 | Norman et al. | |
| 5,804,535 A | 9/1998 | Dobson et al. | |
| 5,879,699 A | 3/1999 | Lerner | |
| 5,979,555 A | 11/1999 | Gadberry et al. | |
| 5,996,692 A | 12/1999 | Chan et al. | |
| 6,063,737 A | 5/2000 | Haberman et al. | |
| 6,063,738 A | 5/2000 | Chatterji et al. | |
| 6,239,183 B1 | 5/2001 | Farmer et al. | |
| 6,283,213 B1 | 9/2001 | Chan | |
| 6,435,277 B1 | 8/2002 | Qu et al. | |
| 6,444,316 B1 | 9/2002 | Reddy et al. | |
| 6,506,710 B1 | 1/2003 | Hoey et al. | |
| 6,527,051 B1 | 3/2003 | Reddy et al. | |
| 6,547,871 B2 | 4/2003 | Chatterji et al. | |
| 6,554,071 B1 | 4/2003 | Reddy et al. | |
| 6,831,043 B2 | 12/2004 | Patel et al. | |
| 6,881,709 B2 | 4/2005 | Nelson et al. | |
| 6,908,888 B2 | 6/2005 | Lee et al. | |
| 7,060,661 B2 | 6/2006 | Dobson, Sr. et al. | |
| 7,084,095 B2 | 8/2006 | Lee et al. | |
| 7,159,659 B2 | 1/2007 | Welton et al. | |
| 7,238,648 B2 | 7/2007 | Dahayanake et al. | |
| 7,279,446 B2 | 10/2007 | Colaco et al. | |
| 7,293,609 B2 | 11/2007 | Dealy et al. | |
| 7,299,874 B2 | 11/2007 | Welton et al. | |
| 7,303,019 B2 | 12/2007 | Welton et al. | |
| 7,320,952 B2 | 1/2008 | Chen et al. | |
| 7,341,980 B2 | 3/2008 | Lee et al. | |
| 7,387,987 B2 | 6/2008 | Chen et al. | |
| 7,527,103 B2 | 5/2009 | Huang et al. | |
| 7,547,663 B2 | 6/2009 | Kirsner | |
| 2002/0193257 A1 | 12/2002 | Lee et al. | |
| 2004/0043905 A1 | 3/2004 | Miller et al. | |
| 2005/0107265 A1 | 5/2005 | Sullivan et al. | |
| 2005/0119401 A1 | 6/2005 | Bavouzet et al. | |
| 2005/0252659 A1 | 11/2005 | Sullivan et al. | |
| 2006/0046937 A1 | 3/2006 | Fu et al. | |
| 2006/0081372 A1 | 4/2006 | Dealy et al. | |
| 2006/0128597 A1 | 6/2006 | Chen et al. | |
| 2006/0183646 A1 | 8/2006 | Welton et al. | |
| 2006/0258541 A1* | 11/2006 | Crews .......................... 507/203 | |
| 2007/0012445 A1 | 1/2007 | Nguyen et al. | |
| 2007/0114022 A1 | 5/2007 | Nguyen | |
| 2007/0123431 A1 | 5/2007 | Jones et al. | |
| 2007/0215355 A1 | 9/2007 | Shapovalov et al. | |
| 2007/0281869 A1 | 12/2007 | Drochon et al. | |
| 2007/0284103 A1 | 12/2007 | Dealy et al. | |
| 2008/0110618 A1 | 5/2008 | Quintero et al. | |
| 2008/0119374 A1 | 5/2008 | Willberg et al. | |
| 2008/0194435 A1 | 8/2008 | Huff et al. | |

(Continued)

FOREIGN PATENT DOCUMENTS

EP 0 037 699 A2 10/1981

(Continued)

OTHER PUBLICATIONS

International Search Report and Written Opinion for PCT/GB2010/001630 dated Oct. 19, 2010.
International Search Report and Written Opinion for PCT/GB2010/001631 dated Oct. 19, 2010.
Office Action for U.S. Appl. No. 12/551,334 dated Jul. 21, 2011.
Schlumberger, ClearFRAC LT Surfactant Article, Apr. 2005.
Crews et al., New Technology Improves Performance of Viscoelastic Surfactant Fluids, SPE-Drilling & Completion, 23, 41-47, 2008.
Samuel et al., Polymer-Free Fluid for Hydraulic Fracturing, SPE 38622, 1997.

(Continued)

Primary Examiner — Timothy J. Kugel
(74) Attorney, Agent, or Firm — Craig W. Roddy; McDermott, Will, Emery, LLP

(57) ABSTRACT

A method comprises providing a drilling fluid comprising: an aqueous fluid; and a microemulsion surfactant; and drilling a well bore in a subterranean formation comprising an oleaginous fluid using the drilling fluid, wherein the microemulsion surfactant forms a microemulsion with the oleaginous fluid within the well bore. In accordance with the method, the subterranean formation has a retained producibility greater than about 50%.

27 Claims, No Drawings

U.S. PATENT DOCUMENTS

| | | | |
|---|---|---|---|
| 2008/0236823 | A1 | 10/2008 | Willberg et al. |
| 2009/0008091 | A1 | 1/2009 | Quintero et al. |
| 2009/0111716 | A1 | 4/2009 | Hough et al. |
| 2010/0056405 | A1 | 3/2010 | Ali et al. |
| 2010/0081586 | A1 | 4/2010 | Smith et al. |
| 2010/0263863 | A1 | 10/2010 | Quintero et al. |
| 2010/0300759 | A1 | 12/2010 | Passade-Boupat et al. |
| 2011/0005773 | A1* | 1/2011 | Dusterhoft et al. ............ 166/376 |
| 2011/0048716 | A1 | 3/2011 | Ezell |
| 2011/0048718 | A1 | 3/2011 | Van Zanten et al. |
| 2011/0053812 | A1 | 3/2011 | Ezell et al. |

FOREIGN PATENT DOCUMENTS

| | | |
|---|---|---|
| EP | 2 085 448 A1 | 8/2009 |
| GB | 2 383 355 A | 6/2003 |
| WO | WO01/42387 A2 | 6/2001 |
| WO | WO 02/070862 A1 | 9/2002 |
| WO | WO2006/029019 A2 | 3/2006 |
| WO | WO2006/029019 A3 | 3/2006 |
| WO | WO2008/045734 A2 | 4/2008 |
| WO | WO2008/045734 A3 | 4/2008 |
| WO | WO 2009/006251 A1 | 1/2009 |
| WO | WO 2009/030868 A2 | 3/2009 |

OTHER PUBLICATIONS

Samuel, et al., A New Solids-Free Non-Damaging High Temperature Lost-Circulation Pill: Development and First Field Applications, SPE 81494, 2003.

Massiera et al., Hairy Wormlike Micelles: Structure and Interactions, Langmuir, 18, 5867-5694, 2002.

Massiera et al., The Steric Polymer Layer of Hairy Wormlike Michelles, Journal of Physics: Condensed Matter, 15, S225-S231, 2003.

Ramos et al., Structure of a New Type of Transient Network: Entangled Wormlike Micelles Bridged by Telechelic Polymers, Macromolecules, 40, 1248-1251, 2007.

Van Zanten, Dissertation, University of California Santa Barbara, pp. 74-143, 2007.

Ingram et al., Enhancing and Sustaining Well Production: Granite Wash, Texas Panhandle, SPE 106531, 2007.

Hellweg, Phase Structures of Microemulsions, Current Opinion in Colloid and Interface, Science 7, 50-56, 2003.

Kunieda et al., Effect of Added Salt on the Maximum Solubilization in an Ionic-Surfactant Microemulsion, Langmuir, 12, 5796-5799, 1996.

Gotch, et al., Formation of Single-Phase Microemulsions in Toluene/Water/Nonionic Surfactant Systems, Langmuir, 24, 4485-4493, 2008.

Welton, et al., Anionic Surfactant Gel Treatment Fluid, Society of Petroleum Engineers, SPE 105815, 2007.

Penny et al., "The Application of Microemulsion Additives in Drilling and Stimulation Results in Enhanced Gas Production," 2005 SPE Production and Operations Symposium held in Oklahoma City, OK, SPE 94274.

International Search Report and Written Opinion for PCT/GB2011/001136 dated Sep. 29, 2011.

International Search Report and Written Opinion for PCT/GB2011/000988 dated Oct. 12, 2011.

* cited by examiner

SURFACTANT ADDITIVES USED TO RETAIN PRODUCIBILITY WHILE DRILLING

BACKGROUND

The present invention relates generally to hydrocarbon production, and more particularly to compositions and methods useful for drilling a well bore in a subterranean formation.

A variety of drilling fluids are used in the drilling of oil and gas wells along with other drilling fluid applications and drilling procedures. In rotary drilling, drilling fluids perform a variety of functions and possess a variety of characteristics. Traditional drilling fluids include drilling muds, or simply "muds." Drilling fluids are generally used to carry cuttings from beneath the drill bit, transport them through the annulus between the drill string and the well bore, and allow their separation at the surface while at the same time cooling and cleaning the drill bit. A drilling mud can also reduce friction between the drill string and the sides of the well bore while maintaining the stability of uncased sections of the borehole.

Typical drilling fluids can be classified according to their base fluid. Water-based muds comprise an aqueous fluid as the continuous phase. Solid particles can be suspended in an aqueous fluid, and in some cases, oil can be emulsified in the water. Similarly, brine-based drilling fluids are water-based muds in which the aqueous fluid is a brine. Oil-based muds (OBM) are the opposite in that an oleaginous fluid comprises the continuous phase. Solid particles can be suspended in oil, and in some cases, water or brine can be emulsified in the oil. The oil continuous phase typically includes, diesel, mineral oil, esters, or alpha-olefins.

Drilling fluids typically contain additives that are used for various purposes. One common additive is a fluid loss additive, which may be used to prevent the intrusion of drilling fluids into the subterranean formation being penetrated and to form a thin, low permeability filter cake which temporarily seals pores and other openings in the subterranean formation. A filter cake is the residue deposited on a permeable surface such as a subterranean formation surface when a slurry, suspoemulsion, or suspension, such as a drilling fluid, is forced against the surface under pressure. A filter cake is defined herein as a combination of any added solids, if any, and drilled solids with the drilling fluid. Filtrate is commonly understood to be the liquid that passes through the surface, leaving the filter cake on the surface. Reduced hydrocarbon production can result from reservoir damage when a poor filter cake allows deep filtrate invasion. In addition, a filter cake can be difficult to remove in some instances.

Thus, clean up of the formation after drilling into subterranean formations with drilling fluids such as water-based muds or OBMs can be an important step in preparing a well for production. Traditional techniques involve the use of one or more secondary fluids to remove or degrade the filter cake prior to producing the well or preparing the well for use as an injection well. As each treatment operation increases the complexity, and thus the cost, of drilling a well bore, more efficient filter cake and formation clean up is desired to maximize hydrocarbon recovery.

SUMMARY

The present invention relates generally to hydrocarbon production, and more particularly to compositions and methods useful for drilling a well bore in a subterranean formation.

In an embodiment, a method comprises providing a drilling fluid comprising: an aqueous fluid; and a microemulsion surfactant; and drilling a well bore in a subterranean formation comprising an oleaginous fluid using the drilling fluid, wherein the microemulsion surfactant forms a microemulsion with the oleaginous fluid within the well bore.

In another embodiment, a method comprises: providing a drilling fluid comprising: an aqueous base fluid; and a microemulsion surfactant; a non-polar fluid; and drilling a well bore in a subterranean formation comprising an oleaginous fluid using the drilling fluid, wherein the microemulsion surfactant forms a microemulsion with at least the non-polar fluid.

In still another embodiment, a method comprises: providing a drilling fluid comprising: an aqueous base fluid; and a microemulsion surfactant; and drilling a well bore in a subterranean formation that comprises a pore throat; and allowing the surfactant to remove an oil block and/or a water block from the pore throat.

The features and advantages of the present invention will be apparent to those skilled in the art. While numerous changes may be made by those skilled in the art, such changes are within the spirit of the invention.

DESCRIPTION OF THE PREFERRED EMBODIMENTS

The present invention relates generally to hydrocarbon production, and more particularly to compositions and methods useful for drilling a well bore in a subterranean formation.

While some advantages are disclosed, not all advantages will be discussed herein. It has been discovered that the use of a drilling fluid capable of forming a microemulsion in-situ can result in a retained producibility greater than other drilling techniques. For example, the use of a drilling fluid of the present invention can result in a retained producibility that is higher than that obtained by using a conventional drilling fluid along with one or more post drilling treatments. As used herein, "retained producibility" refers to the relative permeability of a formation after exposure to a drilling fluid divided by the permeability of the formation prior to exposure to a drilling fluid. In some embodiments, the retained producibility may be greater than 100%, which may indicate that the permeability of the formation is higher after contact with the drilling fluids of the present invention described herein than the formation before contact with the drilling fluid. The ability to increase the permeability of the formation, or in a sense stimulate the formation using the drilling fluid, may represent one advantage of the present invention. As used herein, the term "drilling fluid" includes, but is not limited to, drilling fluids, drill-in fluids, and completion fluids. A "drill-in" fluid is generally a drilling fluid used to drill the well bore into producing portions of a subterranean formation so as to minimize damage, maximize production of exposed zones, and facilitate any necessary well completion needed. Unlike a drilling fluid, a drill-in fluid generally contains few solids, and what solids it does contain are often size controlled to minimize penetration or invasion into the formation matrix to avoid damaging the production formation. As used herein, a drilling operation includes, but is not limited to, a drilling operation, a drill-in operation, an underbalanced drilling operation, an overbalanced drilling operation, and any other drilling operation for subterranean purposes known to one of ordinary skill in the art.

In general, microemulsions are thermodynamically stable, macroscopically homogeneous mixtures of three or more components: a polar phase, a nonpolar phase and a surfactant, which can include more than one surfactant (e.g., with a cosurfactant such as an alcohol, glycol or phenol, or their ethoxy derivatives). In some embodiments, cosurfactants may be included when ionic surfactants are used. Microemulsions form spontaneously and are generally thermodynamically stable. Microemulsion phase formulations can generally be described by Winsor type, including Winsor I, Winsor II and Winsor III. These types are generally described by: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil (e.g., as a part of a three-phase system). In addition, a Winsor IV as a single-phase microemulsion, with no excess oil or excess water. The thermodynamically stable single phase Winsor IV microemulsion could evolve by a change in formulation or composition into the formation of a miniemulsion or nanoemulsion, which is a two-phase system with submicron size droplets which could be stable for long period of time, but not permanently stable as a microemulsion.

It is believed that the formation of the micro-emulsion is thermodynamically favorable and can therefore, form with or without circulation of the drilling fluid. The microemulsion can advantageously form in-situ upon contact of the microemulsion surfactant and an oleaginous fluid, or it can be formed on the surface between a microemulsion surfactant and one or more non-polar fluids. As used herein, an "oleaginous fluid" refers to any fluid hydrocarbon including, but not limited to, oil, natural gas, natural gas condensates, and heavy oil components (e.g., asphaltenes). Thus, a microemulsion surfactant can be used to deliver a non-polar fluid (e.g., a lubricant) to a well bore during drilling while simultaneously forming a in-situ microemulsion with an oleaginous fluid encountered in the well bore. In addition, the use of a drilling fluid comprising a microemulsion surfactant can be used to alter the wettability of the formation surface, remove oil and/or water blocks, and alter the wettability of a filter cake or other fluid loss additive placed into the subterranean formation during drilling. The ability to alter the wettability of a filter cake can improve the damage remediation (filter cake destruction) when mineral acids, organic acids, oxidizing agents, water-soluble enzymes (e.g., catalysts), chelating agents and in situ acid generators are spotted into a well bore after or during the drilling process. Another advantage of the drilling fluids described herein is that the drilling fluid does not require any oil or solvent in the formulation. As a result, the drilling fluids can have a higher loading capacity for incorporation of an oleaginous fluid or a non-polar fluid. As a further advantage, solvents are not needed with the drilling fluid of the present invention as the microemulsion surfactants may be capable of forming microemulsions with a variety of hydrocarbons.

In an embodiment, a method according to the present invention comprises providing a drilling fluid and drilling a well bore in a subterranean formation comprising an oleaginous fluid using the drilling fluid. The drilling fluid is generally a water-based drilling fluid that comprises an aqueous fluid and a microemulsion surfactant. The microemulsion surfactant useful with the present invention can form a microemulsion with the oleaginous fluid within the well bore. In some embodiments, the drilling fluid may comprise a microemulsion surfactant or a surfactant blend and often a surfactant-cosurfactant mixture, in which the co-surfactant can be a short amphiphilic substance such as an alcohol (e.g., propanol, butanol, pentanol in their different isomerization structures, as well as glycols, and ethoxyated and propoxylated alcohols or phenols).

The aqueous fluid used in the drilling fluids of the present invention can comprises any suitable aqueous fluid known to one of ordinary skill in the art. Suitable aqueous fluids may include, but are not limited to, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the drilling fluids of the present invention. In certain embodiments, the density of the aqueous base fluid can be increased, among other purposes, to provide additional particle transport and suspension in the drilling fluids of the present invention. Although an aqueous fluid can be used to form the microemulsions, it will be appreciated that in some embodiments other polar liquids such as alcohols and glycols, alone or together with an aqueous fluid, may also be used. In an embodiment, the aqueous fluid is present in the drilling fluid in an amount ranging from about 40% to about 99.9% by weight of the drilling fluid.

The drilling fluids of the present invention can comprise one or more microemulsion surfactants. In general, a microemulsion surfactant can include any surfactant capable of forming a microemulsion alone or in combination with a co-surfactant. Suitable microemulsion surfactants suitable for use with the drilling fluids of the present invention include, but are not limited to, non-ionic, anionic, cationic and amphoteric surfactants, any derivatives thereof, and any combination thereof. Suitable non-ionic surfactants include, but are not limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both, any derivative thereof, or any combination thereof. The term "derivative," as used herein refers to any compound that is made from one of the identified compounds, for example, by replacing one atom in the listed compound with another atom or group of atoms, or rearranging two or more atoms in the listed compound. Suitable cationic surfactants include, but are not necessarily limited to, arginine methyl esters, alkanolamines, alkylenediamides, alkyl ester sulfonates, alkyl ether sulfonates, alkyl ether sulfates, alkali metal alkyl sulfates, alkyl or alkylaryl sulfonates, sulfosuccinates, alkyl or alkylaryl disulfonates, alkyl disulfates, alcohol polypropoxylated and/or polyethoxylated sulfates, taurates, amine oxides, alkylamine oxides, ethoxylated amides, alkoxylated fatty acids, alkoxylated alcohols, ethoxylated fatty amines, ethoxylated alkyl amines, betaines, modified betaines, alkylamidobetaines, quaternary ammonium compounds, alkyl propoxyethoxysulfonate, alkyl propoxy-ethoxysulfate, alkylaryl-propoxy-ethoxysulfonate, any derivative thereof, and any combination thereof. Specific surfactants may include, but are not limited to, polyoxyethylene sorbitan monopalmitate, polyoxyethylene sorbitan monostearate, polyoxyethylene sorbitan monooleate, linear alcohol alkoxylates, alkyl ether sulfates, dodecylbenzene sulfonic acid, linear nonyl-phenols, dioxane, ethylene oxide, polyethylene glycol, ethoxylated castor oils, dipalmitoyl-phosphatidylcholine, sodium 4-(1' heptylnonyl) benzenesulfonate, polyoxyethylene nonyl phenyl ether, sodium dioctyl sulphosuccinate, tetraethyleneglycoldodecylether, sodium octylbenzenesulfonate, sodium hexadecyl sulfate, sodium laureth sulfate, ethylene oxide, decylamine oxide, dodecylamine betaine, dodecylamine oxide, any derivative thereof, or any combination thereof. In one non-limiting embodiment at least two surfactants in a blend may be used to create single phase microemulsion in-situ. Suitable microemulsion surfactants may also include surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

The amount of microemulsion surfactant included in the drilling fluid may be based on a number of factors including, but not limited to, the type of aqueous fluid, the temperature of the formation, the particular surfactant or surfactant blend used, and the type of optional additives included. In an embodiment, the microemulsion surfactant is present in the drilling fluid in an amount of from about 0.01% to about 20% by weight of the drilling fluid.

In an embodiment, a drilling fluid may comprise a co-surfactant. As used herein, a "co-surfactant" refers to a compound that participates in aggregation of molecules into a micelle but does not aggregate on its own. Suitable co-surfactants useful with the drilling fluids of the present invention include, but are not limited to, alcohols, glycols, phenols, thiols, carboxylates, sulfonates, pyrollidones, any derivative thereof, and any combination thereof. In an embodiment, an alcohol useful as a co-surfactant may have from about 3 to about 10 carbon atoms. In an embodiment, suitable alcohols can include, but are not limited to, t-butanol, n-butanol, n-pentanol, n-hexanol, 2-ethyl-hexanol, propanol, and sec-butanol. Suitable glycols can include, but are not limited to, ethylene glycol, polyethylene glycol, propylene glycols, and triethylene glycol. In an embodiment, a co-surfactant may be included in the drilling fluids of the present invention in an amount ranging from about 0.001% to about 20% by weight of the drilling fluid.

As an advantage of the drilling fluids of the present invention, a solvent is not required as a component of the drilling fluid. As a result of not having a solvent, the drilling fluids can have a higher loading capacity for incorporation of an oleaginous fluid or a non-polar fluid. In an embodiment, typical solvents that are not required in the present invention may comprise a terpene-based solvent, an alkyl acid ester of a short chain alcohol, an aryl acid ester of a short chain alcohol, benzene, toluene, xylene, or any other solvents known to one of ordinary skill in the art for use in a well bore.

In an embodiment, the in-situ fluid contains a non-polar fluid. The non-polar fluid can comprise a variety of additives useful for drilling a well bore in a subterranean formation. In an embodiment, the drilling fluid of the present invention can form a microemulsion with one or more non-polar fluids to allow the transportation of the non-polar fluids into the subterranean formation as part of a substantially homogenous drilling fluid. The drilling fluids may then be capable of delivering at least a portion of the non-polar fluid to a desired location within the subterranean formation during drilling. For example, the drilling fluid may be contacted with a non-polar fluid comprising a lubricant to form a microemulsion. When the drilling fluid is used to drill a well bore, the lubricant can aid in the lubrication of the drill bit. In an embodiment, any number of non-polar fluids may be used to form a microemulsion for delivery to the subterranean formation during drilling. In an embodiment, a non-polar fluid can form a microemulsion with the microemulsion surfactant in addition to the microemulsion surfactant being able to form a microemulsion with an oleaginous fluid within the subterranean formation. As noted above, the drilling fluids of the present invention do not require a solvent or other non-polar liquid. As a result, the drilling fluids may comprise a higher capacity for the non-polar fluid additives and/or the oleaginous fluid.

Suitable additives can include lubricants, which may include a synthetic fluid including, but not necessarily limited to, ester based fluids, paraffins, isomerized olefins, mineral oils, and any combination thereof.

Optionally, the drilling fluids may comprise additional additives such as fluid loss control agents, degradable fluid loss agents, foaming agents, weighting agents, emulsion stabilizers, antifreeze agents, emulsion destabilizers, biocides, algaecides, pH control additives, oxygen scavengers, clay stabilizers, weighting agents, and the like or any other additive that does not adversely affect the drilling fluid. In some embodiments, optional additives may be included in the drill-in fluids in an amount in the range of about 0.001% to about 10% by weight of the drill-in fluid composition. One of ordinary skill in the art with the benefit of this disclosure will recognize that the compatibility of any given additive should be tested to ensure that it does not adversely affect the performance of the consolidating agent emulsion.

In an embodiment, a drilling fluid may comprise a fluid loss control agent for minimizing the loss of the drilling fluid into the subterranean formation. Suitable fluid loss control agents may include, but are not limited to, calcium carbonate, hematite, ilmenite, magnesium tetroxide, manganous oxide, iron carbonate, magnesium oxide, barium sulfate, and mixtures thereof. Additional suitable fluid loss control agents may comprise sized salts. These sized salts may be dissolved with undersaturated water when desired. Suitable salts may include, but are not limited to, NaCl, KCl, NaBr, KBr, HCOOK, HCOONa, CaCl, $CaBr_2$, $ZnBr_2$ and combinations thereof. Fluid loss control agent generally comprises particles that may have a variety of individual sizes. Generally speaking, the particle size distribution of the fluid loss control agent must be sufficient to bridge across and seal the desired opening downhole. For example, if the pore throats (i.e., very small openings) on a portion of a subterranean formation are to be bridged, then it would be beneficial to use a fluid loss control agent with smaller particle size distribution. A suitable size distribution for this type of application would range from about 0.1 microns to about 200 microns.

In some embodiments, the drilling fluids used in the present invention may comprise a degradable fluid loss control agent. Degradable fluid loss control agents are used to, among other things, control leak off into a formation. Suitable degradable fluid loss control agents generally comprise degradable polymers including, but not limited to, polysaccharides, chitins, chitosans, proteins, aliphatic polyesters, poly(lactides), poly(glycolides), poly(ε-caprolactones), poly(hydrooxybutyrates), poly(anhydrides), aliphatic polycarbonates, poly(orthoesters), poly(amino acids), poly(ethylene oxides), polyphoshazenes, and mixtures thereof. In other embodiments, the drilling fluid may comprise degradable, hydratable gel particulates that can be broken down with breakers or through a change in pH; suitable degradable, hydratable gel particulates are described in U.S. Pat. No. 5,680,900, which is incorporated herein by reference in its entirety.

In some embodiments, the drilling fluid may further comprise a foaming agent. As used herein, the term "foamed" also refers to co-mingled fluids. In certain embodiments, it may be desirable to reduce the amount of aqueous fluid that is required in the drilling fluid (e.g., in water sensitive subterranean formations). Various gases can be used for foaming the drilling fluids of this invention, including, but not limited to, nitrogen, carbon dioxide, air, methane, and mixtures thereof. One of ordinary skill in the art with the benefit of this disclosure will be able to select an appropriate gas that may be used for foaming the drill-in fluids of the present invention. Suitable foaming agent surfactants may include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable foaming agents and foam stabilizing agents may be included as well, which will be known to those skilled in the art with the benefit of this disclosure.

In some embodiments, the drilling fluid used in the present invention may further comprise a weighting agent. Weighting agents are used to, among other things, increase the fluid density and thereby affect the hydrostatic pressure exerted by the fluid. Examples of suitable weighting agents include, but are not limited to, potassium chloride, sodium chloride, sodium bromide, calcium chloride, calcium bromide, ammonium chloride, zinc bromide, zinc formate, zinc oxide, and mixtures thereof.

In an embodiment, a drilling fluid may comprise an antifreeze agent to lower the freezing point of the drilling fluid. Other additives may be suitable as well as might be recognized by one skilled in the art with the benefit of this disclosure.

In an embodiment, the drilling fluids may be prepared using any method known to one of ordinary skill in the art. One suitable method may comprise combining the aqueous fluid and the microemulsion surfactant to form a drilling fluid. Any optional additives can then be added to the drilling fluid prior to introduction of the fluid into a subterranean formation.

The drilling fluids may be used to drill into any portion of a subterranean formation including, but not limited to, a producing zone along a well bore. In an embodiment, a method of drilling a well bore through a subterranean formation comprises providing a drilling fluid comprising an aqueous fluid and a microemulsion surfactant, and using the drilling fluid to drill at least a portion of a well bore into a subterranean formation comprising an oleaginous fluid using the drilling fluid, wherein the microemulsion surfactant forms a microemulsion with the oleaginous fluid within the well bore. In an embodiment, the drilling fluid may be used to drill at least a portion of a well bore into the production zone of a subterranean formation.

In some embodiments, at least a portion of the oleaginous fluid may be a heavy hydrocarbon such as a tar, or asphaltene. In these embodiments, the drilling fluid may help remove at least a portion of the heavy hydrocarbons from the subterranean formation. In general, heavy hydrocarbons tend to form deposits on the casing and/or production equipment during drilling and production of the well. While not intending to be limited by theory, it is believed that the formation of a microemulsion with the oleaginous fluid comprising a heavy hydrocarbon may limit or prevent the heavy hydrocarbon from forming deposits as the encapsulation of the oleaginous fluid may limit or prevent it from contacting the sides of the well bore and/or any process equipment.

In an embodiment, a method of drilling a well bore through a subterranean formation comprises providing a drilling fluid comprising: an aqueous base fluid; a microemulsion surfactant; a non-polar fluid; and drilling a well bore in a subterranean formation comprising an oleaginous fluid using the drilling fluid, wherein the microemulsion surfactant forms a microemulsion with at least the non-polar fluid.

In an embodiment, the drilling fluid disclosed herein can be used to alter the wettability of a filter cake and/or the subterranean formation. When a filter cake and/or the formation face is oil wet, compatibility problems can arise for certain completion operations, such as water injection and gravel packing. By altering the wettability of a filter cake and/or the formation face to be more water wet, the filter cake may be more compatible with injection water and brine-based gravel pack carrier fluids. In addition, a water wetting filter cake can be more easily removed with an aqueous based clean-up fluid (e.g., a fluid comprising mineral acids, organic acids, oxidizing agents, water soluble enzymes, and in situ acid generators) if necessary.

In an embodiment, a method of drilling a well bore through a subterranean formation comprises providing a drilling fluid comprising: an aqueous base fluid, a microemulsion surfactant, and drilling a well bore in a subterranean formation. In an embodiment, the drilling fluid increases the water wettability of the subterranean formation by contacting the subterranean formation during drilling. In another embodiment, the drilling fluid also comprises a fluid loss control agent, the fluid loss control agent forms a layer disposed on the subterranean formation and the water wettability of the fluid loss control agent is increased.

A water block generally refers to a condition caused by an increase in water saturation in the near-well bore area. A water block can form when the near-well bore area is exposed to a relatively high volume of filtrate from the drilling fluid. The increased presence of water may cause any clay present in the formation to swell and cause a reduction in permeability and/or the water may collect in the pore throats, resulting in a decreased permeability due to an increased capillary pressure and cohesive forces. Similarly, an oil block generally refers to a condition in which an increased amount of oil saturates the area near the well bore. Due to the wettability of the subterranean formation and the resulting capillary pressure, the oil may reduce the permeability of the subterranean formation to the flow of fluids, including oil and water. In an embodiment, the treatment fluids and methods described herein may be used to remove a water or oil block by removing at least a portion of the water and/or oil in the near well bore area, and/or altering the wettability of the subterranean formation. This may directly or indirectly lead to reduced capillary pressure in the porosity of the formation. Reduced capillary pressure may lead to increased water and/or oil drainage rates. As will be appreciated, improved water-drainage rates should allow a reduction in existing water blocks, as well as a reduction in the formation of water blocks.

In an embodiment, a method of drilling a well bore through a subterranean formation comprises providing a drilling fluid comprising an aqueous base fluid; and a microemulsion surfactant; and drilling a well bore in a subterranean formation that comprises a pore throat; and allowing the surfactant to remove at least a portion of an oil block and/or a water block from the pore throat.

To facilitate a better understanding of the present invention, the following examples of certain aspects of some embodiments are given. In no way should the following examples be read to limit, or define, the scope of the invention.

EXAMPLE 1

In order to demonstrate the retained producibility and various other properties of the drilling fluids of the present invention, three samples labeled Sample 1, Sample 2, and Sample 3 were prepared and tested using a sandstone core plug to measure the retained producibility. In the samples, ALDACIDE® G is a biocide commercially available from Halliburton Energy Services, Inc. of Houston, Tex., OXYGON is an organic acid salt used as an oxygen scavenger, and CFS-511 is an ester based surfactant commercially available from Halliburton Energy Services, Inc. of Houston, Tex. The samples were prepared according to the formulations shown in Table 1. A mixture of the lauryl amidopropyl betaine and butanol at a mole ration of about 1:5.5 was included in the mixture.

TABLE 1

Sample Formulations

| Component | Sample 1 | Sample 2 | Sample 3 |
|---|---|---|---|
| Aqueous Base Fluid | | | |
| Water (bbl) | Balance to produce 0.99 bbl total | 0.904 | 0.868 |
| NaBr (lbs) | | | 105.3 |
| KCl (lbs) | | 42.4 | 26.3 |
| NaCl (lbs) | | 43.4 | 26.3 |
| $NaHCO_3$ (mg/L) | 285 | | |
| $CaCl_2 \cdot 2H_2O$ (mg/L) | 1246 | | |
| $MgCl_2 \cdot 2H_2O$ (mg/L) | 6,174 | | |
| $Na_2SO_4$ (mg/L) | 4,551 | | |
| KCl (mg/L) | 147 | | |
| NaCl (mg/L) | 3,990 | | |
| Additives | | | |
| ALDACIDE G (lbs) | 0.25 | 0.25 | 0.25 |
| OXYGON (lbs) | 0.3 | 0.1 | 0.1 |
| Lauryl amidopropyl betaine & butanol (bbl) | 0.005 | 0.005 | 0.005 |
| CFS-511 (bbl) | 0.005 | 0.005 | 0.005 |

The samples were tested according to the following procedure. A Berea Sandstone core was vacuum saturated using a synthetic Azeri formation water. The synthetic Azeri formation water had a salt content as shown in Table 2.

TABLE 2

Synthetic Formation Water Salt Concentrations

| Component | Concentration |
|---|---|
| $NaHCO_3$ (mg/L) | 3,359 |
| $CaCl_2 \cdot 2H_2O$ (mg/L) | 331 |
| $MgCl_2 \cdot 2H_2O$ (mg/L) | 110 |
| KCl (mg/L) | 80 |
| NaCl (mg/L) | 19,044 |
| $Na_2SO_4$ (mg/L) | 22 |
| $BaCl_2 \cdot 2H_2O$ (mg/L) | 21 |
| $SrCl_2 \cdot 6H_2O$ (mg/L) | 24 |

The core was loaded into a sealed permeameter and pressurized to 1,000 pounds per square inch ("psi"). The permeameter allows flow through the core in two directions, the first defined as the treatment direction and the opposite direction defined as the production direction. The core was heated to 158° F. (70° C.) and a 500 psi backpressure was applied. SOLTROL® (a non-volatile isoparaffin available from Chevron Phillips Chemical Company L.P. of the Woodlands, Tex.) was flowed through the core at a constant rate of 2 milliliter ("mL") per minute in the production direction until a stable pressure drop and permeability were observed. The initial permeability of the core was taken as this value. About 10 pore volumes of Sample 1 were then passed through the core in the injection direction. SOLTROL® was then allowed to flow through the core in the production direction and the returned permeability was measured. This value was used to calculate the retained producibility of the core.

At least about 10 pore volumes of synthetic Azeri formation water was used to flow through the core in the production direction to help return the core to its starting condition. The process was repeated starting with flowing SOLTROL® through the core at 2 mL per minute in the production direction to measure the initial permeability in order to measure the results with Sample 2 and Sample 3. After all the samples were run, SOLTROL® was allowed to flow through the core in the production direction. The measurements were performed using the same core. The retained producibility was measured as both the retained producibility when the SOLTROL® was allowed to flow back through the core in the production direction and when the synthetic formation water was allowed to flow back through the core in the production direction. The results of the retained producibility are shown in Table 3.

TABLE 3

Retained Producibility Results

| Sample | Retained Producibility with SOLTROL® Flowback | Retained Producibility with Synthetic Formation Water Flowback |
|---|---|---|
| Sample 1 | 136% | 128% |
| Sample 2 | 135% | 102% |
| Sample 3 | 100% | 107% |

Based on these results it can be seen that the retained producibility was greater than 100% for both the SOLTROL® flowback and the synthetic formation water flowback. In an embodiment, the retained producibility would be measured using the values obtained upon flowing formation water through the formation, which would be most closely simulated by the synthetic formation water flowback value.

Comparative examples were prepared without the microemulsion additive (i.e., identical samples without the lauryl amidopropyl betaine & butanol additive). These samples showed retained producibilities between 35% and 75%. As would be evident to one of ordinary skill in the art, the use of the drilling fluid according to the present invention allows for an improved retained producibility relative to conventional drilling fluids.

EXAMPLE 2

A variety of surfactant packages were tested against comparative solvent/surfactant treatment fluids using 150 µD Crab Orchard sandstone cores according to the procedure described in Example 1 above. The samples were labeled Samples 4 through Sample 10. The samples comprising a microemulsion surfactant according to the present invention included Sample 4 comprising decylamine oxide and octyl pyrollidone, Sample 5 comprising dodecylamine betaine and butanol, and Sample 6 comprising dodecylamine oxide. Comparative samples included Sample 7 comprising an emulsified terpene/surfactant combination such as a combination of terpene and an ethoxylated alcohol which is available as GasPerm 1000$^{SM}$ available from Halliburton Energy Services, Inc. of Houston, Tex.; Sample 8 comprising a terpene solvent and a surfactant which is available as MA-844 available from Halliburton Energy Services, Inc. of Houston, Tex.; Sample 9 comprising a potassium chloride brine alone; and Sample 10 comprising a traditional amphoteric surfactant (tallow amidopropyl betaine. The resulting retained producabilities are shown in Table 4.

TABLE 4

Retained Producibility Results

| Sample | Retained Producibility |
| --- | --- |
| Sample 4 | 80% |
| Sample 5 | 100% |
| Sample 6 | 100% |
| Sample 7 | 60% |
| Sample 8 | 40% |
| Sample 9 | 30% |
| Sample 10 | 20% |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a drilling fluid comprising:
an aqueous fluid; and
a microemulsion surfactant; and
drilling a well bore in a subterranean formation comprising an oleaginous fluid using the drilling fluid, wherein the microemulsion surfactant forms a microemulsion with the oleaginous fluid within the well bore.

2. The method of claim 1 wherein the drilling fluid comprises at least one microemulsion surfactant selected from the group consisting of: an anionic surfactant, a cationic surfactant, a zwitterionic surfactant, and any combination thereof.

3. The method of claim 2 further comprising a co-surfactant.

4. The method of claim 3 wherein the co-surfactant comprises at least one compound selected from the group consisting of: an alcohol, a glycol, a phenol, a thiol, a carboxylate, a sulfonate, a pyrollidone, any derivative thereof, and any combination thereof.

5. The method of claim 2 wherein the microemulsion surfactant comprises at least one surfactant selected from the group consisting of: arginine methyl esters, alkanolamines, alkylenediamides, alkyl ester sulfonates, alkyl ether sulfonates, alkyl ether sulfates, alkali metal alkyl sulfates, alkyl or alkylaryl sulfonates, sulfosuccinates, alkyl or alkylaryl disulfonates, alkyl disulfates, alcohol polypropoxylated and/or polyethoxylated sulfates, taurates, amine oxides, alkylamine oxides, ethoxylated amides, alkoxylated fatty acids, alkoxylated alcohols, ethoxylated fatty amines, ethoxylated alkyl amines, betaines, modified betaines, alkylamidobetaines, quaternary ammonium compounds, any derivative thereof, and any combination thereof.

6. The method of claim 1 wherein the drilling fluid comprises a non-ionic microemulsion surfactant.

7. The method of claim 6 wherein the non-ionic microemulsion surfactant comprises at least one surfactant selected from the group consisting of: alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both, any derivative thereof, and any combination thereof.

8. The method of claim 1 wherein the subterranean formation has a retained producibility greater than about 50%.

9. The method of claim 1 wherein the subterranean formation has a retained producibility greater than about 100%.

10. The method of claim 1 wherein the microemulsion surfactant is present in the drilling fluid in an amount of from about 0.01% to about 20% by weight of the drilling fluid.

11. The method of claim 1 wherein the step of drilling a well bore in a subterranean formation involves a subterranean operation selected from the group consisting of a drilling operation, a drill-in operation, an underbalanced drilling operation, and an overbalanced drilling operation.

12. The method of claim 1 wherein the drilling fluid increases the water wettability of the subterranean formation.

13. The method of claim 1 wherein the drilling fluid further comprises a fluid loss control agent, and wherein the fluid loss control agent forms a layer disposed on the subterranean formation, and wherein the drilling fluid increases the water wettability of fluid loss control agent.

14. The method of claim 1 wherein the drilling fluid prevents the formation of a water block in the subterranean formation.

15. A method comprising:
providing a drilling fluid comprising:
an aqueous base fluid;
a microemulsion surfactant;
a non-polar fluid; and
drilling a well bore in a subterranean formation comprising an oleaginous fluid using the drilling fluid, wherein the microemulsion surfactant forms a microemulsion with at least the nonpolar fluid.

16. The method of claim 15 wherein the non-polar fluid comprises a lubricant.

17. The method of claim 16 wherein the drilling fluid prevents the lubricant from increasing the oil wettability of the subterranean formation.

18. The method of claim 15 wherein the subterranean formation has a retained producibility greater than about 50%.

19. The method of claim 15 wherein the drilling fluid comprises at least one microemulsion surfactant selected from the group consisting of: an anionic surfactant, a cationic surfactant, a non-ionic surfactant, a zwitterionic surfactant, and any combination thereof.

20. The method of claim 15 wherein the formation of the microemulsion prevents the nonpolar fluid, the oleaginous fluid, or both from forming an emulsion block.

21. The method of claim 15 further comprising a co-surfactant.

22. A method comprising:
   providing a drilling fluid comprising:
      an aqueous base fluid; and
      a microemulsion surfactant; and
   drilling a well bore in a subterranean formation that comprises a pore throat; and allowing the surfactant to remove an oil block, a water block, or both from the pore throat.

23. The method of claim 22 wherein the subterranean formation has a retained producibility greater than about 50%.

24. The method of claim 22 wherein the drilling fluid comprises at least one microemulsion surfactant selected from the group consisting of: an anionic surfactant, a cationic surfactant, a non-ionic surfactant, a zwitterionic surfactant, and any combination thereof.

25. The method of claim 22 wherein the drilling fluid further comprises a co-surfactant.

26. The method of claim 22 wherein the drilling fluid increases the water wettability of the subterranean formation.

27. The method of claim 22 wherein the microemulsion surfactant is present in the drilling fluid in an amount of from about 0.1% to about 20% by weight of the drilling fluid.

* * * * *